United States Patent
Piasco et al.

(10) Patent No.: US 12,475,590 B2
(45) Date of Patent: Nov. 18, 2025

(54) DEVICES AND METHODS FOR VISUAL LOCALIZATION

(71) Applicant: HUAWEI TECHNOLOGIES CO., LTD., Shenzhen (CN)

(72) Inventors: Nathan Piasco, Boulogne Billancourt (FR); Dzmitry Tsishkou, Boulogne Billancourt (FR); Tao Yin, Shenzhen (CN); Arthur Moreau, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 158 days.

(21) Appl. No.: 18/328,611

(22) Filed: Jun. 2, 2023

(65) Prior Publication Data
US 2023/0306631 A1    Sep. 28, 2023

Related U.S. Application Data

(63) Continuation of application No. PCT/EP2020/084472, filed on Dec. 3, 2020.

(51) Int. Cl.
*G06T 7/70* (2017.01)
*G06T 7/20* (2017.01)
*G06T 19/20* (2011.01)

(52) U.S. Cl.
CPC .............. *G06T 7/70* (2017.01); *G06T 7/20* (2013.01); *G06T 19/20* (2013.01);
(Continued)

(58) Field of Classification Search
CPC .. G06T 7/74; G06T 19/20; G06T 7/70; G06T 7/20; G06T 2219/2016; G06T 2207/20084;
(Continued)

(56) References Cited

U.S. PATENT DOCUMENTS 9,940,553 B2   4/2018  Shotton et al.
10,504,008 B1  12/2019  Powers et al.
(Continued)

FOREIGN PATENT DOCUMENTS

| CN | 108230240 A | 6/2018 |
| WO | 2012106068 A2 | 8/2012 |
| WO | 2020088739 A1 | 5/2020 |

OTHER PUBLICATIONS

Purkait et al., "Synthetic View Generation for Absolute Pose Regression and Image Synthesis," British Machine Vision Conference, Total 12 pages (Jan. 2018).
(Continued)

*Primary Examiner* — Xilin Guo
(74) *Attorney, Agent, or Firm* — Leydig, Voit & Mayer, Ltd.

(57) ABSTRACT

A computing device is provided for supporting a mobile device to perform a visual localization in a target environment. The computing device is configured to obtain and modify one or more 3D models of the target environment to generate a set of 3D models. The computing device is further configured to determine a set of training samples based on the set of 3D models. Each training sample comprises an image derived from the set of the 3D models and corresponding pose information. The computing device is further configured to train a neural network model based on the set of training samples, so that the trained neural network model is configured to predict pose information for an image captured in the target environment and to output a confidence value associated with the predicted pose information.

20 Claims, 14 Drawing Sheets

(52) U.S. Cl.
CPC ............... *G06T 2207/20081* (2013.01); *G06T 2207/20084* (2013.01); *G06T 2207/30241* (2013.01); *G06T 2207/30244* (2013.01); *G06T 2219/2016* (2013.01)

(58) Field of Classification Search
CPC . G06T 2207/30244; G06T 2207/10016; G06T 2207/10028; G06T 2207/30525; G06T 2207/30241; G06T 2207/20081; G06T 2207/20076; G06T 17/00; G06N 3/08; G06N 20/00; G06V 10/82; G06V 10/774
See application file for complete search history.

(56) References Cited

U.S. PATENT DOCUMENTS

| | | | |
|---|---|---|---|
| 10,614,581 | B2 | 4/2020 | Senthamil |
| 11,004,230 | B2 * | 5/2021 | Pollefeys ................. G06T 7/70 |
| 2021/0110137 | A1 * | 4/2021 | Kerzner ............... G06F 18/2413 |
| 2021/0279957 | A1 * | 9/2021 | Eder ...................... H04N 23/90 |
| 2022/0301221 | A1 * | 9/2022 | Klein .................. G06F 18/2431 |

OTHER PUBLICATIONS

Chen et al., "A Survey on Deep Learning for Localization and Mapping: Towards the Age of Spatial Machine Intelligence," arxiv.org, arXiv:2006.12567v2 [cs.CV], XP081708132, Total 26 pages (Jun. 2020).

Sattler et al., "Understanding the Limitations of CNN-Based Absolute Camera Pose Regression," 2019 IEEE/CVF Conference on Computer Vision and Pattern Recognition (CVPR), Total 11 pages (Mar. 18, 2019).

* cited by examiner

DEVICES AND METHODS FOR VISUAL LOCALIZATION

CROSS-REFERENCE TO RELATED APPLICATIONS

This application is a continuation of International Application No. PCT/EP2020/084472, filed on Dec. 3, 2020, the disclosure of which is hereby incorporated by reference in its entirety.

TECHNICAL FIELD

Embodiments of the present disclosure relate to devices and methods for visual localization in a target environment, in particular, to a mobile device performing the visual localization and a computing device for supporting the mobile device to perform the visual localization.

BACKGROUND

Visual localization (also known as image-based localization, or camera relocalization) is widely used in robotics and computer vision. Visual localization refers to a process of determining object or camera pose information within an environment. The pose information comprises at least one of position information and orientation information. Determining the pose information by performing the visual localization can be used for application scenarios such as navigation, advanced driver-assistance systems, autonomous driving, augmented reality, virtual reality, structure from motion (SfM), simultaneous localization and mapping (SLAM), etc.

With the help of artificial intelligence (AI) approaches, neural networks may be applied for performing the visual localization. A conventional learning-based visual localization usually comprises two phases: an offline phase (also known as a training phase) and an online phase (also known as a prediction phase). In the offline phase, images and associated DoF pose(s) are collected and labelled by one or more sensors in the environment as training samples. It is noted that DoF stands for degrees of freedom. An object or a camera in a three-dimensional (3D) space may move in six ways, i.e., three directional axes and three rotational axes. Each of these axes is a DoF. Depending on hardware capabilities of the one or more sensors, one or more of the six axes may be tracked. In particular, one or more of the three directional axes may be tracked for determining the position information, and one or more of the three rotational axes may be tracked for determining the orientation information. In the offline phase, a neural network model is trained by using the training samples to obtain a trained (or learned) neural network model. Then, in the online phase, the trained neural network model is applied to perform or support the visual localization in the target environment.

SUMMARY

The conventional learning-based visual localization uses a model, which is trained based on a fixed representation of the target environment. In particular, the training samples are static, and are obtained during a specific period of time or multiple specific periods of time. Therefore, the training samples fail to reflect a dynamic evolution of the target environment.

Moreover, the training samples only provide a partial coverage of the target environment. In particular, the training samples comprises a finite set of observations that do not spatially cover the target environment in its entirety.

Moreover, the conventional learning-based visual localization fails to provide a reliable estimation of confidence with respect to a predicted result. Therefore, a practical usage of the conventional learning-based visual localization is limited.

Moreover, the conventional learning-based visual localization requires a dependency between collected data and sensors. In particular, training samples of the offline phase and input data of the online phase need to be similar in terms of modality (such as radiometry and geometry) and sensor configuration (such as configurations of camera lens). Therefore, a deployment of the conventional learning-based visual localization is limited and is not portable.

In view of the above-mentioned problems, embodiments of the present disclosure aim to provide a robust learning-based visual localization. Further, an objective is to provide the learning-based visual localization with efficient and flexible deployment, and with a reliable pose confidence prediction.

These and other objectives are achieved by the embodiments of the present disclosure as described in the enclosed independent claims. Further implementations of the embodiments of the present disclosure are further defined in the dependent claims.

A concept underlying embodiments of the present disclosure is to implement a confidence-aware learning-based visual localization method. This method employs a neural network model trained by using visual data, which has been rendered from a set of 3D models. Optionally, the set of 3D models may be constantly improved over time by migrating crowd-sourced feedback from various platforms that perform the visual localization by using the trained neural network model in the environment.

A first aspect of the present disclosure provides a computing device for supporting a mobile device to perform a visual localization in a target environment.

The computing device is configured to obtain one or more 3D models of the target environment.

Then, the computing device is configured to generate a set of 3D models of the target environment by modifying the obtained one or more 3D models of the target environment.

Then, the computing device is configured to determine a set of training samples, in which each training sample comprises an image derived from the set of 3D models and corresponding pose information in the target environment.

In this way, a dynamic evolution of the target environment may be augmented and reflected in the set of 3D models and the set of training samples, respectively. In particular, by deriving an image for each training sample, every aspect in the target environment may be reflected.

Finally, the computing device is configured to train a model based on the set of training samples, in which the trained model is configured to predict pose information for an image obtained in the target environment and output a confidence value associated with the predicted pose information.

In this way, the trained model may be robust to parameter changes in the target environment, such as changes in light intensity, shadows, reflections, and textures. Further, a diversity of the representation of the target environment may be increased, which may lead to more reliable predictions.

Notably, the pose information may resemble a pose of a sensor or camera (e.g. of the mobile device) in the target environment that corresponds to the image, i.e., the image of the target environment looks like when captured by the sensor or camera having said pose. The pose information comprises at least one of position information and orientation information. The position information may denote a position of the sensor or camera in the target environment, which may be defined with respect to three directional axes (e.g., the axes of a Cartesian coordinate system). The orientation information may denote an orientation of the sensor or camera in the target environment, which may be defined with respect to three rotational axes (e.g., yaw, pitch, roll axes in the Cartesian coordinate system).

Optionally, each of the obtained one or more 3D models may be based on one or more sample images and associated sample pose information. The one or more sample images and the associated sample pose information may be obtained by using a fleet of mapping platforms to scan the target environment at one or more positions and from one or more orientations. Each of the fleet of mapping platforms may be equipped with one or more sensors. The one or more sensors may comprise at least one of the following: one or more visual cameras, one or more depth cameras, one or more time-of-flight (ToF) cameras, one or more monocular cameras, a light detection and ranging (LiDAR) system, and one or more odometry sensors. The one or more visual cameras may comprise at least one of a color sensor and a monochrome sensor. The one or more odometry sensors may comprise at least one of an inertial measurement unit (IMU), a magnetic compass, and a wheel odometer.

In an implementation form of the first aspect, the one or more 3D models may comprise a plurality of different 3D models of the target environment.

In particular, the plurality of different 3D models may be based on different sample images and different sample pose information at different locations and from different orientations of the target environment.

In this way, the diversity of the one or more 3D models may be increased.

In another implementation form of the first aspect, an image of the target environment may comprise at least one of:
  a picture of the target environment;
  a depth map of the target environment;
  a scan of the target environment.

Notably, the image of the target environment may either be an image derived from the set of 3D models, or an image obtained in the target environment for predicting the pose information.

In another implementation form of the first aspect, the computing device may be further configured to:
  model an artificial mobile device including one or more visual sensors; and
  determine the set of training samples based further on the artificial mobile device.

Optionally, the artificial mobile device may have a common sensor configurations as one of the mapping platforms. Alternatively, sensor configurations of the artificial mobile device may be modified for determining the set of training samples.

Notably, the common sensor arrangement may be understood as being substantially a same sensor arrangement.

In another implementation form of the first aspect, the computing device may be further configured to:
  compute a set of trajectories, wherein each trajectory models a movement of the mobile device in the target environment; and
  determine the set of training samples based further on the set of trajectories.

Optionally, the set of trajectories may traverse positions of the target environment.

In this way, a substantially full coverage of the target environment may be achieved. Further, a flexibility of the trained model may be improved. That is, the trained model may be further adapted to mobile devices that have various different sensor configurations.

In another implementation form of the first aspect, for modifying the one or more 3D models of the target environment, the computing device is configured to perform at least one of the following:
  augmenting the 3D model of the target environment with one or more artificial sources of illumination;
  adding to the 3D model of the target environment at least one of a static object and a dynamic object.

In particular, the static object may be referred to an object that is stationary in the target environment. The dynamic object may be referred to an object that is moving in the target environment.

In this way, the trained model may be robust to occlusions and visual changes in the target environment.

In another implementation form of the first aspect, for modifying the one or more 3D models of the target environment, the computing device may be configured to apply a domain translation operation on the one or more 3D models of the target environment.

In another implementation form of the first aspect, the computing device may be further configured to apply a domain translation operation or other data augmentation operation on one or more training samples of the set of training samples before training the model based on the set of training samples.

Optionally, the domain translation operation may be performed by using a multi-domain image translation network architecture.

In particular, the multi-domain image translation network architecture may be based on a generative adversarial network (GAN). The GAN may be adapted to translate one or images from a first domain to a second domain.

In another implementation form of the first aspect, the computing device may be further configured to:
  provide the trained model to the mobile device;
  receive feedback information from the mobile device, the feedback information comprising an image obtained in the target environment and corresponding pose information; and
  retrain the trained model based on the feedback information.

In this way, an accuracy of the trained model may be improved. Further, a sustainable and long-term deployment of the mobile device for performing the visual localization may be achieved.

In another implementation form of the first aspect, the computing device may be further configured to:
  provide the trained model to one or more further mobile devices;
  receive feedback information from each of the one or more further mobile devices; and
  retrain the trained model based on all the received feedback information.

In another implementation form of the first aspect, the set of training samples may comprise:
  a first subset of training samples for training the model to predict pose information for images obtained in the target environment; and a second subset of training samples, disjoint to the first subset of training samples, for training the model to provide confidence values for predictions of pose information.

In this way, an accuracy of the predicted pose information may be quantified. The mobile device may determine a trust threshold based on the confidence values, in which the trust threshold is used to determine whether or not to trust the predicted pose information.

In another implementation form of the first aspect, the computing device may be a mobile device and may be configured to train and/or retrain the model in collaboration with one or more further mobile devices.

In particular, the computing device may be the mobile device that performs the visual localization in the target environment. Alternatively, the computing device may be a component of the mobile device.

This may have an advantage that, for example, only one device may be involved in the offline phase and online phase such that hardware resources can be saved.

Moreover, the computing device may be a node of a distributed computing network. The computing device may be configured to (re-)train the model in collaboration with one or more further mobile devices (computing devices).

This may have an advantage that, for example, a performance (i.e., a speed and accuracy) of the (re-)trained model for the visual localization may be further improved.

In another implementation form of the first aspect, the computing device may be configured to request the one or more 3D models of the target environment from one or more mapping platforms for producing 3D models.

A second aspect of the present disclosure provides a mobile device for performing a visual localization in a target environment. The mobile device is configured to:
  receive a trained model from a computing device;
  capture an image in the target environment;
  input the image into the trained model, in which the trained model is configured to predict pose information corresponding to the image and to output a confidence value associated with the predicted pose information; and
  if the confidence value is below a threshold, provide feedback information to the computing device, the feedback information comprising the image and the predicted pose information.

Notably, the pose information may comprise at least one of position information and orientation information.

In this way, an accuracy of the trained model may be further improved based on the feedback information.

In an implementation form of the second aspect, the image in the target environment may comprise at least one of:
  a picture of the target environment;
  a depth map of the target environment;
  a scan of the target environment.

A third aspect of the present disclosure provides a method for supporting a mobile device to perform a visual localization in a target environment, the method comprising:
  obtaining one or more 3D models of the target environment;
  generating a set of 3D models of the target environment by modifying the obtained one or more 3D models of the target environment;
  determining a set of training samples, wherein each training sample comprises an image derived from the set of 3D models and corresponding pose information in the target environment; and
  training a model based on the set of training samples, wherein the trained model is configured to predict pose information for an image obtained in the target environment and output a confidence value associated with the predicted pose information.

Notably, the pose information may comprise at least one of position information and orientation information.

In an implementation form of the third aspect, the one or more 3D models may comprise a plurality of different 3D models of the target environment.

In another implementation form of the third aspect, an image of the target environment may comprise at least one of:
  a picture of the target environment;
  a depth map of the target environment;
  a scan of the target environment.

Notably, the image of the target environment may either be an image derived from the set of 3D models, or an image obtained in the target environment for predicting the pose information.

In another implementation form of the third aspect, the method may further comprise:
  modelling an artificial mobile device including one or more visual sensors; and
  determining the set of training samples based further on the artificial mobile device.

In another implementation form of the third aspect, the method may further comprise:
  computing a set of trajectories, wherein each trajectory models a movement of the mobile device in the target environment; and
  determining the set of training samples based further on the set of trajectories.

In another implementation form of the third aspect, the step of modifying the one or more 3D models of the target environment may comprise at least one of the following:
  augmenting the 3D model of the target environment with one or more artificial sources of illumination;
  adding to the 3D model of the target environment at least one of a static object and a dynamic object.

In another implementation form of the third aspect, the step of modifying the one or more 3D models of the target environment may comprise applying a domain translation operation on the one or more 3D models of the target environment.

In another implementation form of the third aspect, the method may further comprise applying a domain translation operation or other data augmentation operation on one or more training samples of the set of training samples before training the model based on the set of training samples.

In another implementation form of the third aspect, the method may further comprise:
  providing the trained model to the mobile device;
  receiving feedback information from the mobile device, the feedback information comprising an image obtained in the target environment and corresponding pose information;
  and
  retraining the trained model based on the feedback information.

In another implementation form of the third aspect, the method may further comprise:
  providing the trained model to one or more further mobile devices;

receiving feedback information from each of the one or more further mobile devices; and retraining the trained model based on all the received feedback information.

In another implementation form of the third aspect, the set of training samples may comprise:

a first subset of training samples for training the model to predict pose information for images obtained in the target environment; and a second subset of training samples, disjoint to the first subset of training samples, for training the model to provide confidence values for predictions of pose information.

In another implementation form of the third aspect, the computing device may be a mobile device and the method may further comprise training and/or retraining the model in collaboration with one or more further mobile devices.

In another implementation form of the third aspect, the method may comprise requesting the one or more 3D models of the target environment from one or more mapping platforms for producing 3D models.

A fourth aspect of the present disclosure provides a method for a mobile device performing a visual localization in a target environment. The method comprises:

receiving a trained model from a computing device;

capturing an image in the target environment;

inputting the image into the trained model, wherein the trained model is configured to predict pose information corresponding to the image and to output a confidence value associated with the predicted pose information; and if the confidence value is below a threshold, providing feedback information to the computing device, the feedback information comprising the image and the predicted pose information.

Notably, the pose information may comprise at least one of position information and orientation information.

In an implementation form of the fourth aspect, the image in the target environment may comprise at least one of:

a picture of the target environment;

a depth map of the target environment;

a scan of the target environment.

A fifth aspect of the present disclosure provides a program code for performing the method according to the third aspect or any of its implementation forms, when executed on a computer.

A sixth aspect of the present disclosure provides a program code for performing the method according to the fourth aspect or any of its implementation forms, when executed on a computer.

A seventh aspect of the present disclosure provides a non-transitory storage medium storing executable program code which, when executed by a processor, causes the method according to the third aspect or any of its implementation forms to be performed.

An eighth aspect of the present disclosure provides a non-transitory storage medium storing executable program code which, when executed by a processor, causes the method according to the fourth aspect or any of its implementation forms to be performed.

A ninth aspect of the present disclosure provides a computer product comprising a memory and a processor, which are configured to store and execute program code to perform a method according to the third aspect or any implementation form thereof.

A tenth aspect of the present disclosure provides a computer product comprising a memory and a processor, which are configured to store and execute program code to perform a method according to the fourth aspect or any implementation form thereof.

In particular, the memory may be distributed over a plurality of physical devices. A plurality of processors that co-operate in executing the program code may be referred to as a processor.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings, in which.

DETAILED DESCRIPTION OF EMBODIMENTS

In FIGS. 1 to 14, corresponding elements are labelled with the same reference signs, and share the same features and functions likewise.

Figure 1:
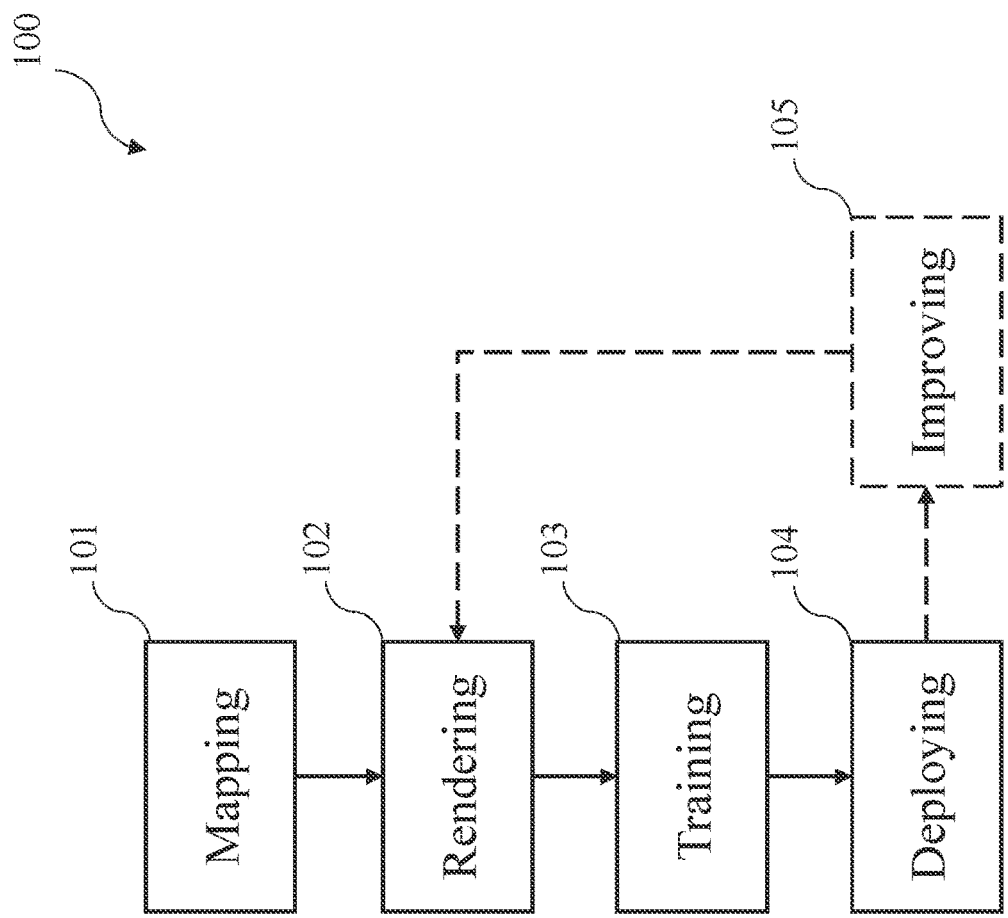
FIG. 1 shows a diagram of a method of a visual localization according to an embodiment of the invention.

FIG. 1 shows a diagram of a method 100 of a visual localization according to an embodiment of the invention. The method 100 comprises steps (also referred to as operations) of mapping 101, rendering 102, training 103, and deploying 104. Optionally, the method 100 may further comprise improving 105. Details regarding each operation are illustrated in the following.

Figure 2:
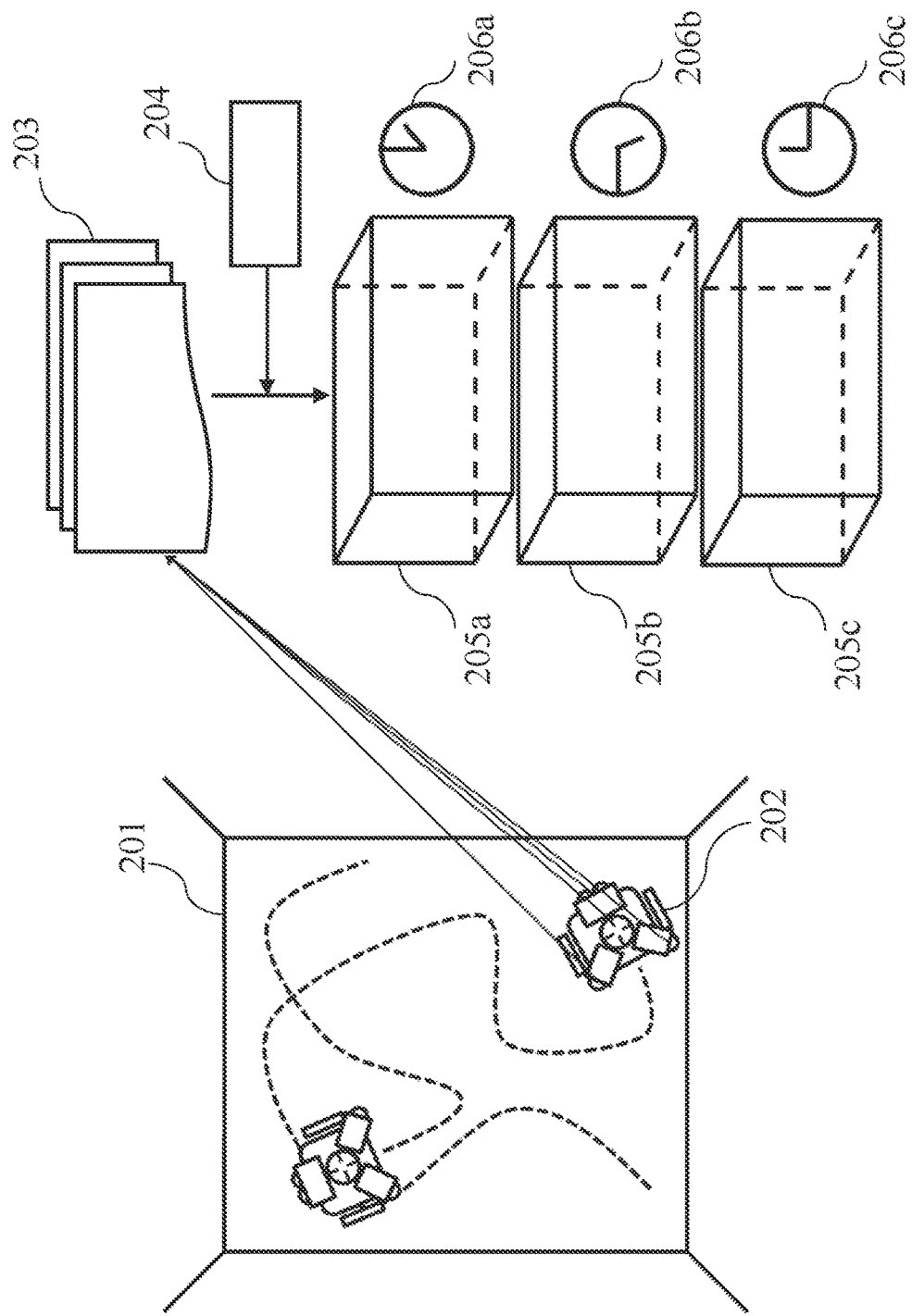
FIG. 2 shows an operation of mapping according to an embodiment of the invention.

FIG. 2 shows an operation of mapping 101 according to an embodiment of the invention.

In the step of mapping 101, one or more mapping platforms 202 may be deployed in a target environment 201.

Notably, the target environment 201 may be an area to be mapped for performing the visual localization. The target environment 201 may be an indoor environment or an outdoor environment. For example, the target environment may be a single room, a private house, an office building, a warehouse, a shopping center, a parking area, a street, or a park etc. Only as an example, the target environment 201 in FIG. 2 is illustrated as being a single room with four walls from a top view. However, the target environment 201 shall not be limited to this illustration of FIG. 2.

In particular, the target environment 201 may be referred to a physical space. Optionally, the physical space may comprise one or more objects. The one or more objects may be stationary or moving.

In some embodiments, each mapping platform 202 may be configured to collect mapping data 203 for generating one or more 3D models of the target environment 201. The mapping data 203 may comprise at least one the following: images of the target environment at different positions and from different orientations, associated pose information of the images, geometry measurements of the target environment, illuminance of the target environment, and timestamps of the mapping data. For collecting the mapping data 203, the mapping platform 202 may be equipped with at least one of the following sensors:

one or more visual cameras;
one or more depth cameras;
one or more ToF cameras;
one or more monocular cameras;
a LiDAR system;
a photometer;
one or more odometry sensors.

Optionally, the one or more visual cameras may comprise at least one of a color sensor and a monochrome sensor. The one or more odometry sensors may comprise at least one of an IMU, a magnetic compass, and a wheel odometer.

Optionally, the images of the target environment 201 may comprise at least one of a color image, a monochrome image, a depth image, and a scan of the target environment 201. In particular, the scan of the target environment 201 may be a scan by using the LiDAR system.

Furthermore, the mapping platform 202 may send the mapping data 203 to a computing device for supporting a mobile device to perform the visual localization in the target environment 201.

Based on the mapping data 203, the computing device may be configured to obtain one or more 3D models 205. To this end, a 3D reconstruction algorithm 204 may be used to generate the one or more 3D models 205.

Optionally, the 3D reconstruction algorithm 204 may be a dense reconstruction algorithm that is used to stitch the images together based on the corresponding pose information. In particular, adjoining pose information may be selected and may be used to project inside a common frame of a 3D model 205 of the target environment 201, and the corresponding images may be projected accordingly and may be stitched together onto the common frame based on the pose information.

In some cases, the sensors may provide direct geometry measurement data of the target environment 201, such as the depth cameras or the LiDAR system. Therefore, the images may be directly projected onto the common frame based on the direct geometry measurement data.

In some other cases, the sensors may provide indirect geometry measurement data target environment 201, such as the monocular cameras. Multiple observations are accumulated and projected inside a common frame. Further, extrinsic calibrations with other sensors may be used.

In some other cases, the direct and the indirect geometry measurement data may be combined together in the dense reconstruction algorithm so that an optimal 3D model may be achieved.

Optionally, the 3D model may be optimized through a robust mapping algorithm, such as the SLAM, the SfM, a bundle adjustment, and a factor graph optimization. Moreover, the 3D model may be post-processed by an outlier removal algorithm, a mesh reconstruction algorithm, and a visual equalization algorithm, in order to obtain a dense and coherent representation of the target environment 201.

In some embodiments, the computing device may directly request the one or more 3D models of the target environment 201 from one or more mapping platforms. In this case, each of the one or more 3D models may be generated in each mapping platform. Similarly, the same 3D reconstruction algorithm as mentioned above may be used by each mapping platform.

Optionally, multiple versions of the target environment may be mapped either by running multiple mapping sessions at different times of the day, or by collecting multiple mapping data from different mapping platforms. As a result, more than one 3D model (205a, 205b, 205c) may be obtained. In this case, each 3D model (205a; 205b; 205c) may be labelled with a different version (206a; 206b; 206c). It is noted that three 3D models are depicted in FIG. 2 only for illustration purpose. The number of the one or more 3D models is not limited by the illustration of FIG. 2.

In some embodiments, each of the one or more 3D models 205 may be represented as a dense point cloud, or as a watertight textured mesh.

Figure 3:
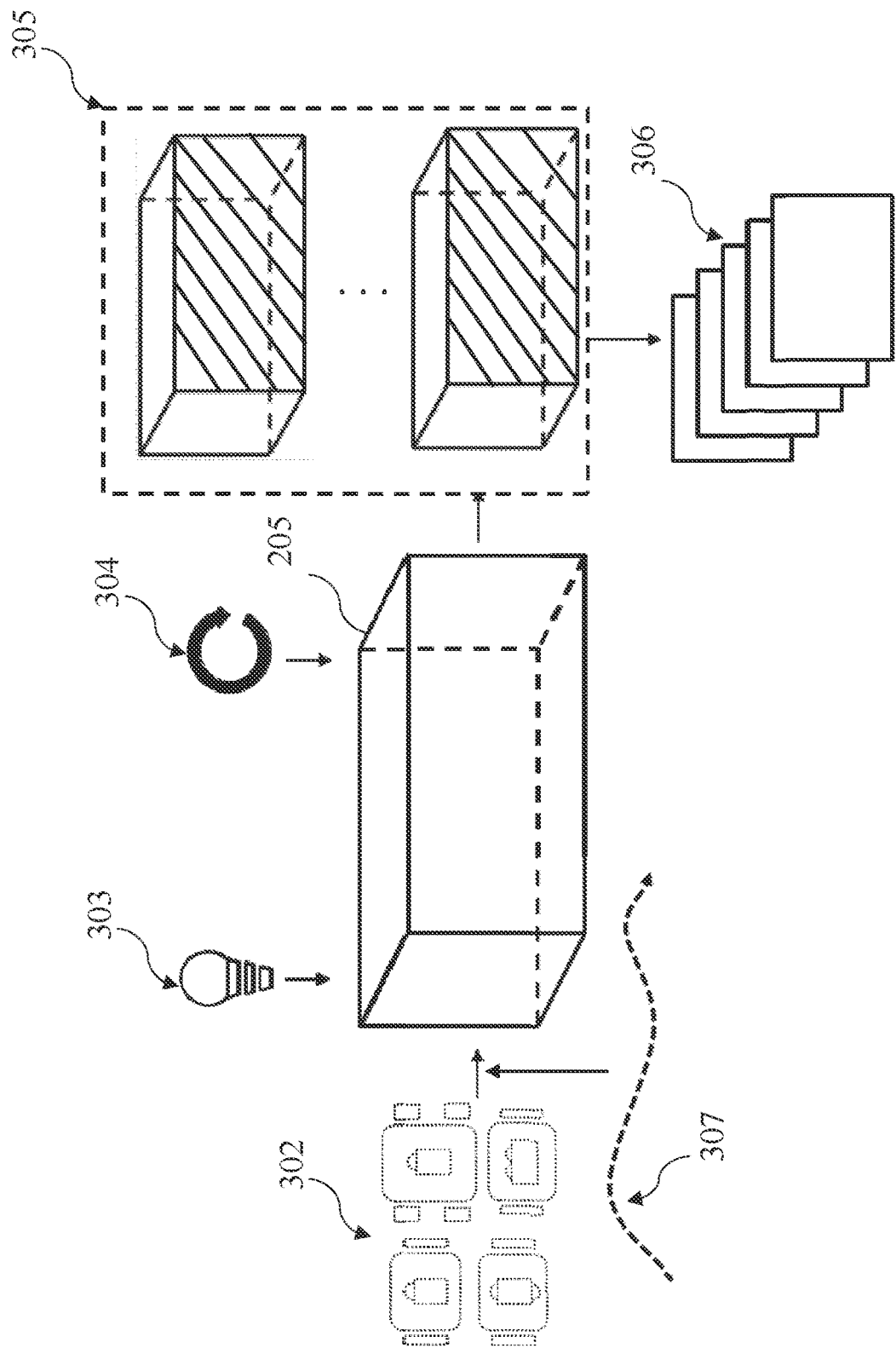
FIG. 3 shows an operation of rendering according to an embodiment of the invention.

FIG. 3 shows an operation of rendering 102 according to an embodiment of the invention.

In the step of rendering 102, the one or more 3D models 205 may be modified by the computing device to generate a set of 3D models 305, i.e., a set of modified 3D models. This set of modified 3D models 305 is then used to determine a set of training samples 306 by the computing device. As a result, a diversity of the training samples 306 may be improved.

Specifically, the computing device may be configured to model an artificial (or virtual) mobile device 302. The artificial mobile device 302 may be equipped with one or more virtual sensors that are matched to the one or more sensors of the mapping platform 202. For example, if the one or more sensors of the mapping platform 202 comprise a visual camera, the one or more virtual sensors of the artificial mobile device 302 may also comprise a virtual visual camera that shares the same lens type (e.g., the same field of view, the same fisheye, and/or the same distortion) as the visual camera of the mapping platform 202.

Moreover, an arrangement of the one or more virtual sensors on the artificial mobile device 302 may be the same as of the one or more sensors of the mapping platform 202.

The arrangement may comprise position and orientation of sensors, and may further comprise occlusion of sensors.

Optionally, for modelling the artificial mobile device 302, the computing device may be configured to obtain sensor information of the mobile device that performs the visual localization in the target environment 201. Then, the computing device may be configured to set up the artificial mobile device 302 according to the obtained sensor information. Notably, the sensor information may comprise a quantity, types, and an arrangement of sensor(s) on the mobile device that performs the visual localization in the target environment 201.

This may have an advantage that, for example, a similarity between the set of training sample generated by the artificial mobile device 302 and images obtained by the mobile device in the online phase may be increased. Therefore, an accuracy of the visual localization performed by the mobile device may be further improved.

In some embodiments, for modifying the one or more 3D models 205 of the target environment 201, the computing device may be configured to augment the one or more 3D models 205 of the target environment 201 with one or more artificial sources of illumination 303. Alternatively or additionally, the computing device may be configured to add one or more static and/or dynamic objects to the one or more 3D models 205 of the target environment 201. Alternatively or additionally, the computing device may be configured to apply a domain translation operation on the one or more 3D models 205 of the target environment 201.

Notably, the domain translation operation on the one or more 3D models 205 is to translate the one or more 3D models 205 from one domain to another. A domain is characterized by a set of attributes. Each attributed is a meaningful property (or parameter) of the one or more 3D models. For example, but not exhaustively, the meaningful property may be a reference point, a geometric center, a color space, or a texture of a 3D model.

Optionally, the domain translation operation may be performed by using a GAN. The GAN is well-known in the art and needs not be described in greater detail herein.

After generating the set of modified 3D models 305, the computing device may be configured to compute a set of trajectories. Each trajectory 307 may model a movement of the mobile device in the target environment 201, so that the artificial mobile device may simulate the movement of the mobile device that performs the visual localization.

Moreover, the computing device may be configured to determine a set of training samples 306. Each training sample may comprise an image that is derived from the set of modified 3D models, and may comprise corresponding pose information in the target environment 201.

For determining the set of training samples 306, the computing device may be configured to synthesize images based on the trajectories. In particular, an image of each training sample may be "captured" or rendered by the virtual visual camera of the artificial mobile device 302 at a particular position of the set of trajectories. Further, the corresponding pose information of each training sample may be collected by relevant virtual sensors of the artificial mobile device 302.

Optionally, a quantity of the training samples 306 may be adjusted by setting a sampling frequency of the artificial mobile device 302.

In this way, a size of the set of training samples may be controllable and may be adjusted based on hardware configurations, computation capabilities, and requirements, such as precision and delay, for performing the visual localization.

Optionally, similar to the domain translation operation on the one or more 3D models 205, the computing device may also be configured to apply the domain translation on one or more of the training samples 306.

Alternatively, other data augmentation operations, such as image processing approaches, may also be applied to one or more of the training samples.

Alternatively or additionally, the set of training samples 306 may comprise depth images and scans of the LiDAR system in order to introduce surrogate modality for the step of training.

Notably, the "artificial" herein may mean that a subject is simulated by the computing device, or that the subject is realized as a computer program running on the computing device. That is, the subject is virtual. In other words, the subject does not physically exist.

In some embodiments, the set of modified 3D models 305 may alternatively be realistic hand-designed 3D models based on a detailed map of the target environment, such as building information models (also known as BIMs).

Figure 4:
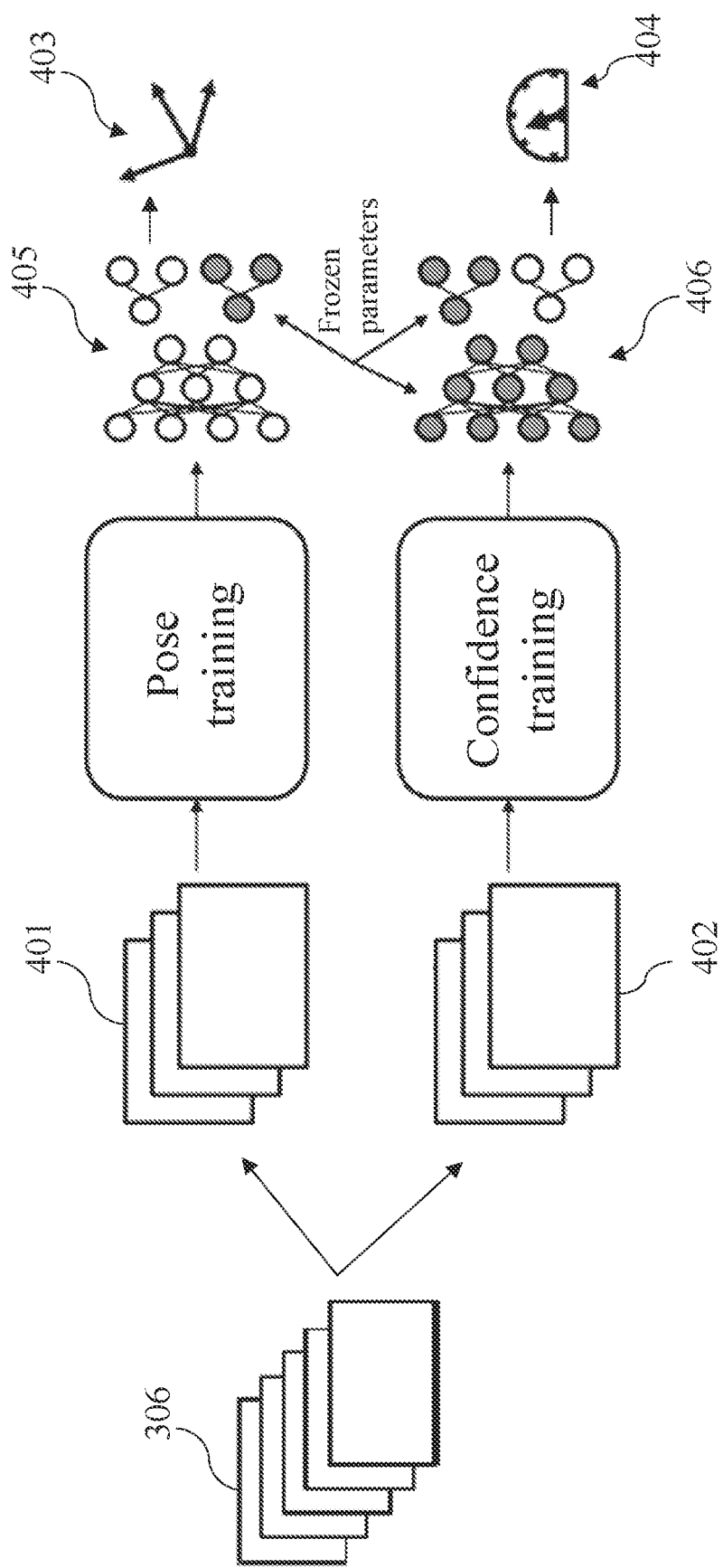
FIG. 4 shows an operation of training according to an embodiment of the invention.

FIG. 4 shows an operation of training 103 according to an embodiment of the invention.

In the step of training 103, a model is trained by the computing device based on the set of training samples 306 in order to obtain a trained model. The trained model is configured to predict pose information 403 for an image obtained in the target environment 201 and output a confidence value 404 associated with the predicted pose information. The confidence value 404 may be a numeral used to quantify a reliability of the predicted pose information by the trained model. For example, the confidence value may be in a range of 0 to 1 ([0, 1]), in which 0 indicates a least reliable predicted pose information and 1 indicates a most reliable predicted pose information.

Notably, the model has no relation with any of the 3D models mentioned above. Specifically, the model may be a model of an artificial neural network (ANN), which in essence may be a mathematic model. The ANN may also be a neural network. That is, the model may be a neural network model. In particular, the model may be a model of a convolutional neural network (CNN).

In particular, the model before the training (i.e., untrained model) may comprise initialized weights (i.e., parameters) that are not optimized for performing the visual localization. A purpose of the training 103 is to adjust or fine-tune the weights of the model for performing the visual localization. For example, a supervised learning method may be used to train the model. Further, the trained model may be a set of weights of a machine learning algorithm that is capable of predicting pose information for an image in the target environment and confidence value associated with the pose information.

In some embodiments, the set of training samples 306 may comprise a first subset of training samples 401 and a second subset of training samples 402. The first subset of training samples 401 may be used to train the model to predict pose information 403 for one or more obtained images in the target environment 201. The second subset of training samples 402 may be disjoint to the first subset of training samples 401, and may be used to train the model to provide one or more confidence values 404 corresponding to the predicted pose information 403.

In particular, a part of adjusted weights of the model after a training may be frozen. For example, FIG. 4 shows that a pose training and a confidence training on the model. After the pose training, adjusted parameters (white neurons in a half-trained model 405) may be frozen. Then, this model with frozen weights may be further used for the confidence training. Thus, in a further half-trained model 406, the corresponding frozen neurons are greyed in FIG. 4. Vice versa, adjusted neurons in the further half-trained model 406 (white neurons in 406) may be frozen in the half-trained model 405 (grey neurons in 405). Further, the confidence training may be based on a network pose prediction and a ground truth prediction. Instead of using a difference between the network pose prediction and a ground truth pose of the ground truth prediction as a training signal, the model may be trained to predict confidence of the predicted pose inversely proportional to an aleatoric uncertainty. Then, a combination of the adjusted weights (e.g., a combination of white neurons in models 405 and 406 of FIG. 4) after the pose training and the confidence training may form the trained model.

Optionally, for the confidence training, the model may be trained to output a corresponding confidence value for each DoF pose information. For example, when three DoF poses are used collectively as an input to the model in a training round, i.e. a 3-DoF pose estimation, the model may output three confidence values corresponding to each of the estimated pose information.

Optionally, when two or more DoF poses are used collectively as the input, the model may be configured to output a covariance matrix associated with the two or more pieces of DoF pose information. The covariance matrix may be used to indicate statistical relationships between any two pieces of the pose information that are estimated by the model. For example, when six DoF poses are used to train the model in a training round, i.e. a 6-DoF pose estimation, the covariance matrix may be a 6×6 matrix. The covariance matrix may be integrated in the online phase, so that a performance of the visual localization may be further improved.

Moreover, the computing device may be configured to send the trained model to the mobile device that performs the visual localization in the target environment 201.

Other aspects of training a model (i.e., the neural network model) are well-known in the art. For example, a model initialization, a weights adjustment, iterations of the model are well-known for those skilled in the art. Therefore, details regarding the training of the model need not be described herein.

Figure 5:
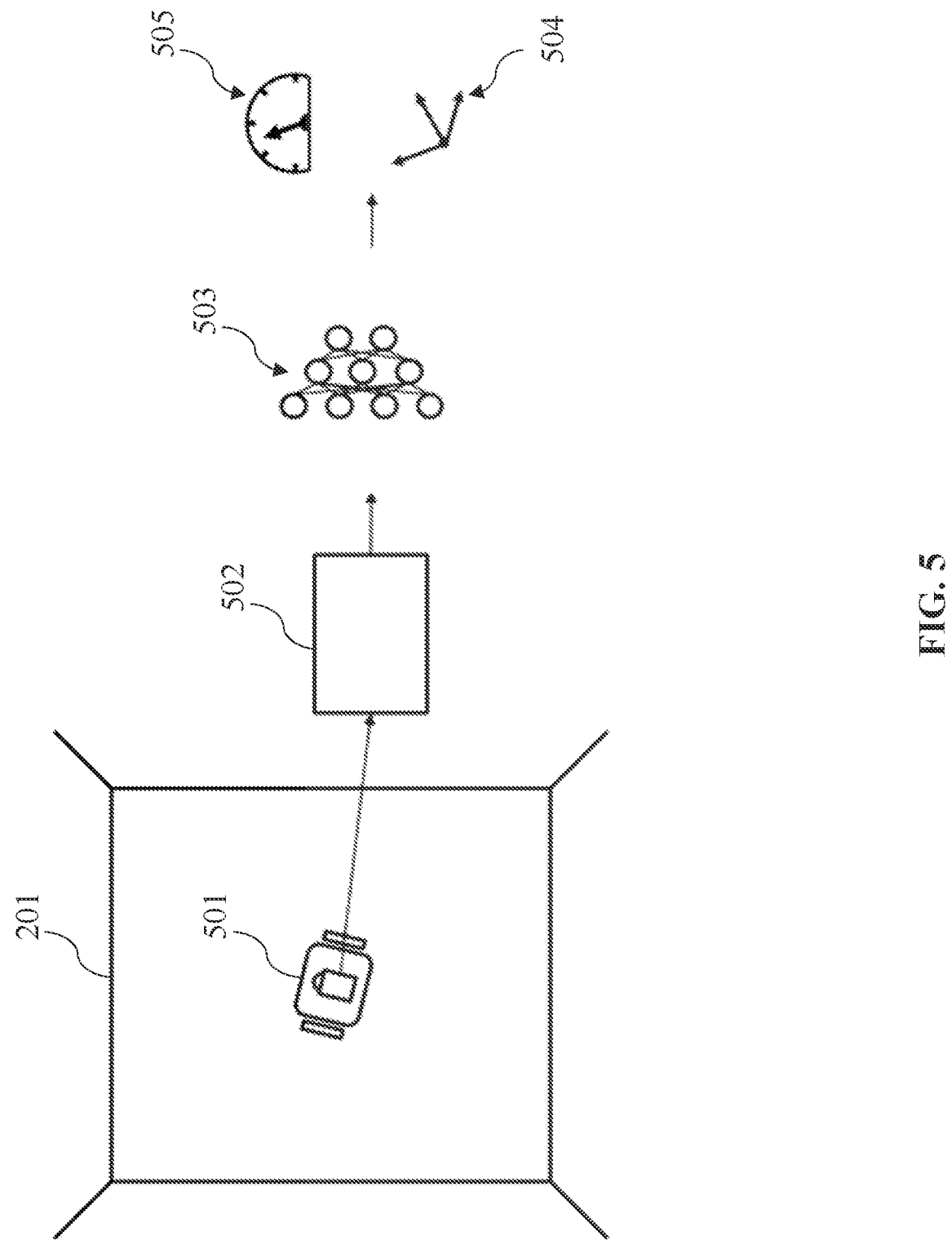
FIG. 5 shows an operation of deploying according to an embodiment of the invention.

FIG. 5 shows an operation of deploying 104 according to an embodiment of the invention.

In the step of deploying 104, the mobile device 501 for performing the visual localization in the target environment 201 is configured to receive a trained model 503 from the computing device. The trained model 503 may be migrated into the mobile device 501 for a practical deployment. Then, the mobile device 501 is configured to capture an image 502 in the target environment 201 and to input the captured image 502 into the trained model 503. Then, the trained model 503 is configured to predict pose information 504 corresponding to the image 502, and to output a confidence value 505 associated with the predicted pose information 504. The predicted pose information may be used to relocalize cameras of the mobile device 501 in the target environment.

In particular, the mobile device 501 may further comprise a visual camera to capture the image.

Figure 6:
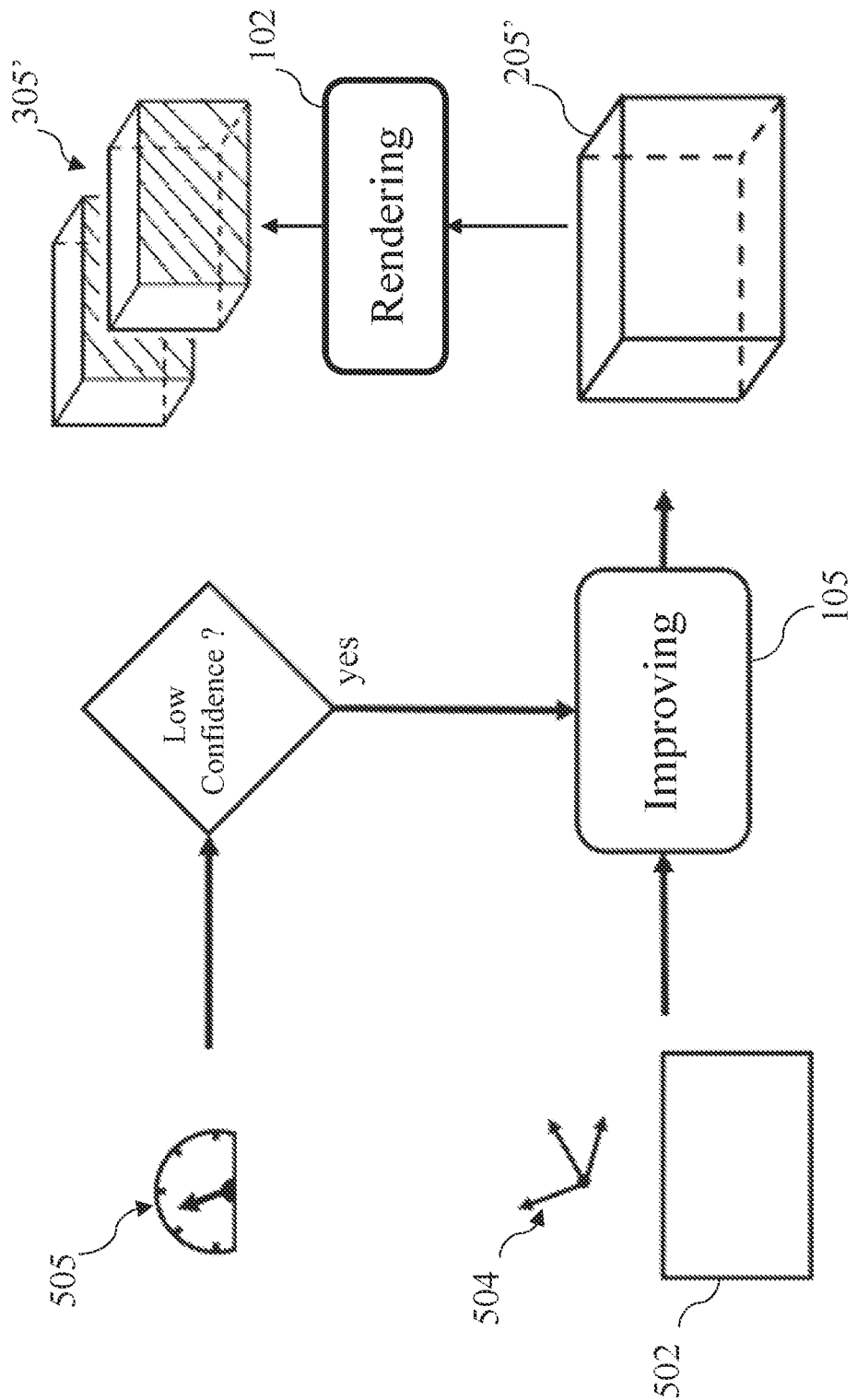
FIG. 6 shows an optional operation of improving according to an embodiment of the invention.

FIG. 6 shows an optional operation of improving 105 according to an embodiment of the invention.

In the step of improving 105, if the confidence value is below a threshold, for example, the threshold being a value of 0.7, the mobile device 501 is configured to provide feedback information to the computing device, in which the feedback information comprises the captured image 502 and the predicted pose information 504.

In this way, the deployed mobile device 501 may be configured to continuously improve the trained model 503 so that an accuracy of the trained model 503 may be constantly improved.

In some embodiments, the feedback information may be sent by the mobile device 501 to the computing device in real time. Alternatively, the feedback information may be stored in the mobile device 501 and may be sent to the computing device at a later stage.

After receiving the feedback information, the computing device may be configured to build one or more updated 3D model 205' of the target environment 201. Similar to the aforementioned step of rendering 102, the computing device may be configured to modify the one or more updated 3D model 205' to obtain a set of modified 3D models 305'.

Further, the computing device may be further configured to retrain the trained model based on the obtained set of modified 3D models 305', so that an updated trained model is obtained. This updated trained model may be then sent to the mobile device 501 for updating. The operation of retraining herein may share the same features and functions as the step of training 103.

Alternatively, the computing device may be configured to train a new model based on the obtained set of modified 3D models 305' to obtain the updated trained model.

Notably, the step of improving 105, rendering 102, (re-)training, and deploying 104 may be iterated so that the trained model may be constantly improved.

In some embodiments, the computing device may be configured to receive feedback information from more than one mobile devices. Therefore, the accuracy of the trained model may be improved further based on crowd sourced feedbacks from the mobile devices.

Figure 7:
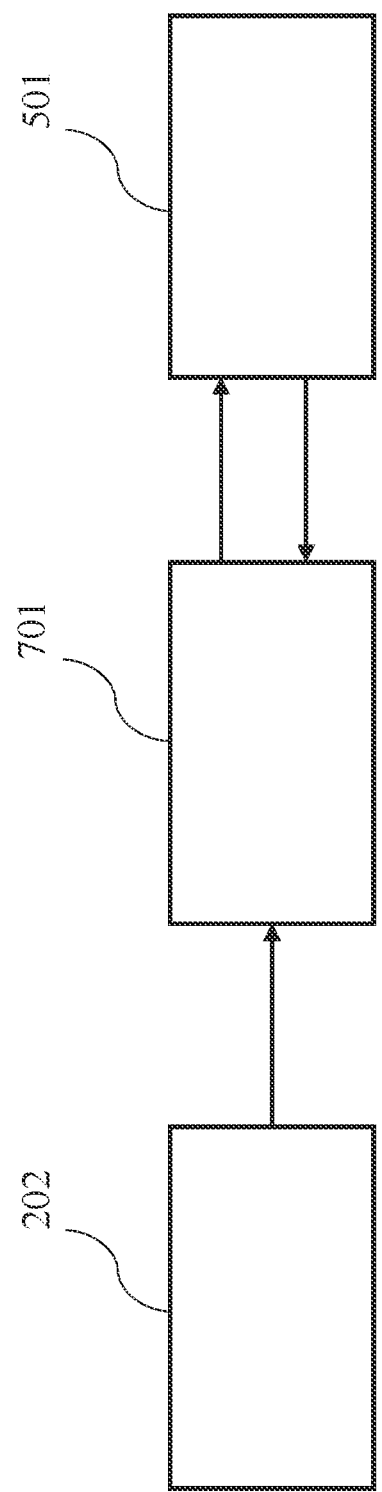
FIG. 7 shows a computing device and a mobile device according to an embodiment of the invention.

FIG. 7 shows a computing device 701 and the mobile device 501 according to an embodiment of the invention.

The computing device 701 may be configured to receive the mapping data from the mapping platform 202. After the step of mapping 101, rendering 102, and training 103, the computing device 501 may be configured to send a trained model to the mobile device 501. The mobile device 501 may be deployed based on the trained model and may provide the feedback information to the computing device 701.

It is noted that elements shown in FIG. 7 are only illustrated to show interactions between the mapping platform 202, the computing device 701, and the mobile device 501. The structural relationship between the computing device 701 and the mobile device 501 may not be limited to the illustration in FIG. 7. In some embodiments, the computing device 701 may be the mobile device 501. That is, a device that is used in the offline phase may be referred to as the computing device 701; the same device that is used in the online phase may be referred to as the mobile device 501.

Alternatively or additionally, the computing device 701 may be a component of the mobile device 501. For example, the computing device 701 may comprise at least one of a central processing unit of the mobile device 501, a graphic processing unit of the mobile device 501, a tensor processing unit of the mobile device 501, a neural processing unit of the mobile device 501, and the like.

Figure 8:
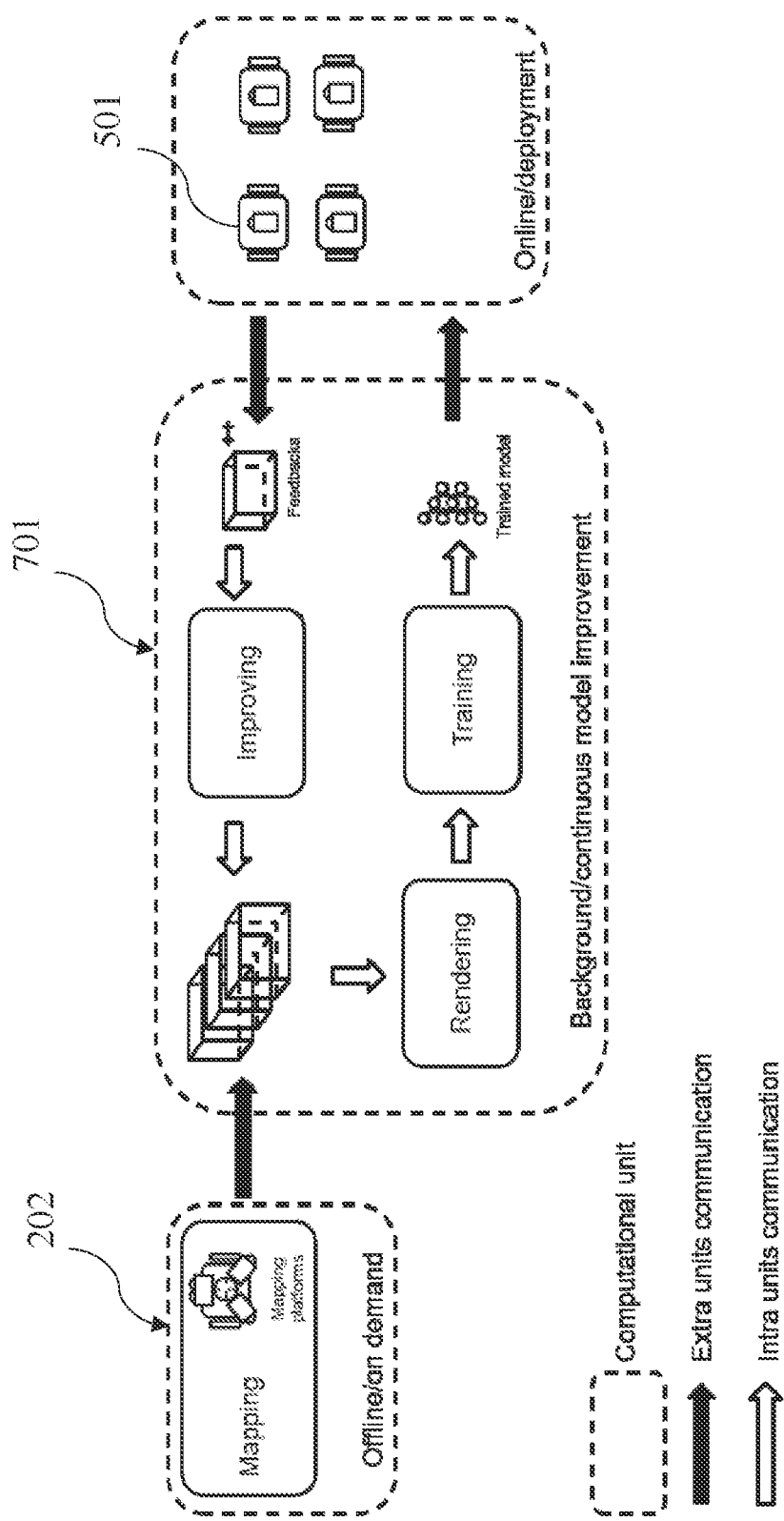
FIG. 8 shows a detailed illustration of interactions between a mapping platform, a computing device, and a mobile device according to an embodiment of the invention.

FIG. 8 shows a detailed illustration of interactions between the mapping device 202, the computing device 701, and more than one mobile devices according to an embodiment of the invention.

In FIG. 8, the computing device 701 may provide the trained model to more than one mobile devices. Then, the computing device may receive feedback information from one or more of the mobile devices, and may retrain the trained model based on the received feedback information.

Figure 9:
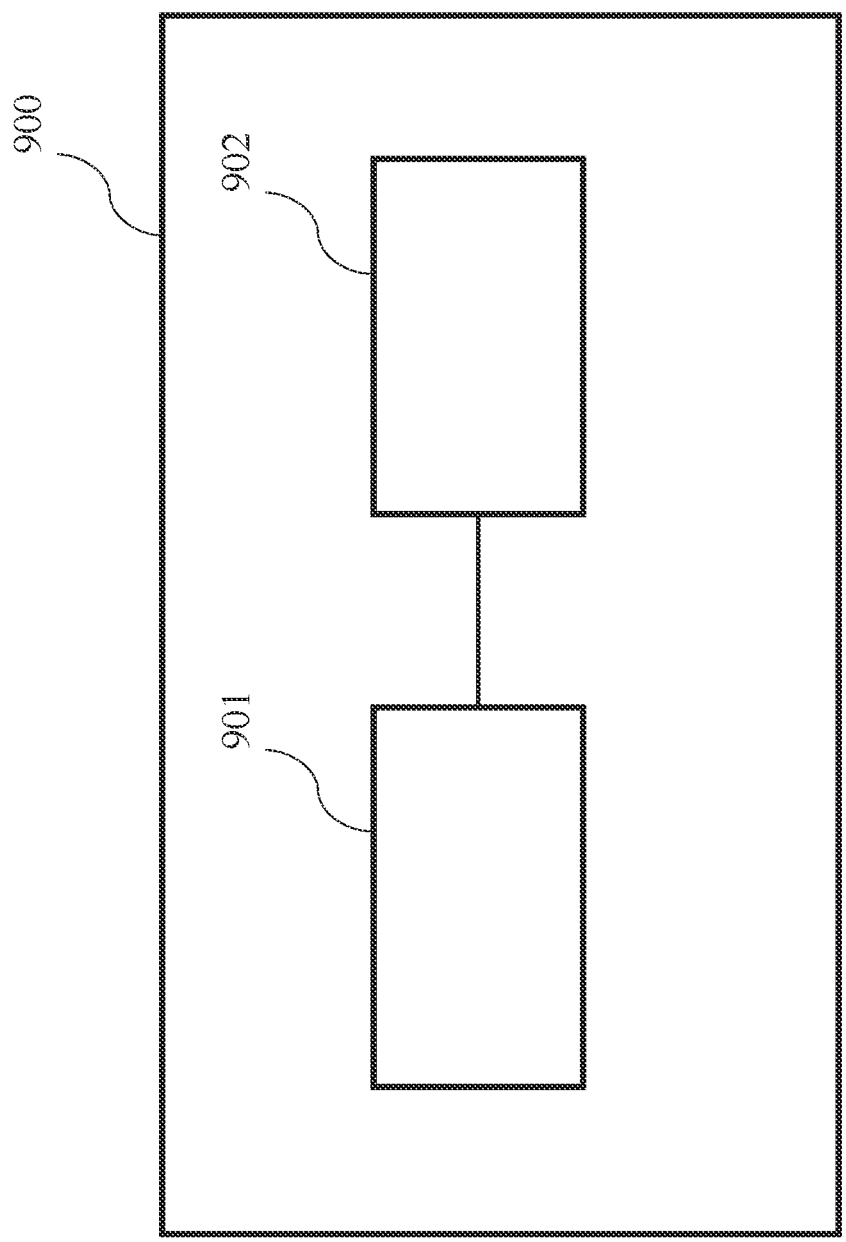
FIG. 9 shows a computing device according to an embodiment of the invention.

FIG. 9 shows a computing device 900 according to an embodiment of the invention. The computing device 900 may comprise one or more processors 901, and a computer memory 902 that can be read by the one or more processors 901. Merely as an example, and not limitation, the computer memory 902 may include computer storage media in the form of volatile and/or non-volatile memory such as read only memory (ROM) and random access memory (RAM).

In some embodiments, a computer program may be stored in the computer memory 902. The computer program, when executed by the one or more processors 901, may cause the computing device 900 to perform the steps of mapping 101, rendering 102, and training 103 as illustrated in FIG. 2-4, respectively. Optionally, the step of improving 105 as illustrated in FIG. 6 may also be performed.

Figure 10:
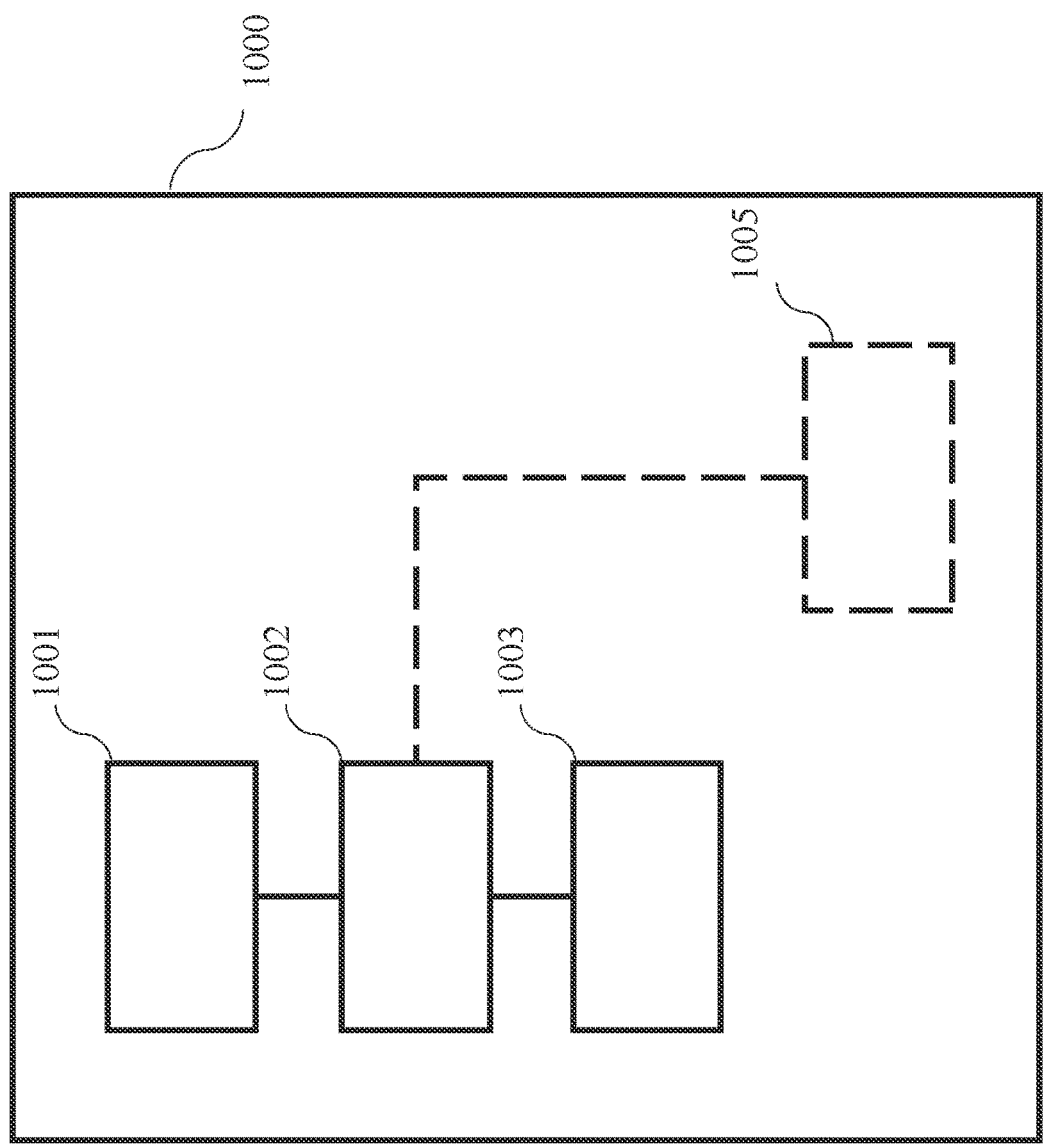
FIG. 10 shows a computing device according to another embodiment of the invention.

FIG. 10 shows a computing device 1000 according to another embodiment of the invention.

The computing device 1000 may comprise:
a mapping unit 1001 configured to perform the step of mapping 101 as illustrated in FIG. 2;
a rendering unit 1002 configured to perform the step of rendering 102 as illustrated in FIG. 3; and
a training unit 1003 configured to perform the step of training 103 as illustrated in FIG. 4.

Optionally, the computing device 1000 may further comprise an improving unit 1005 configured to perform the step of improving 105 as illustrated in FIG. 6.

Notably, the computing device 1000 may be a single electronic device capable of computing, or a set of connected electronic devices capable of computing with a shared system memory. It is well-known in the art that such computing capabilities may be incorporated into many different devices and therefore the term "computing device" may comprise PCs, servers, mobile phones, tablets, game consoles, graphic cards, and the like.

Figure 11:
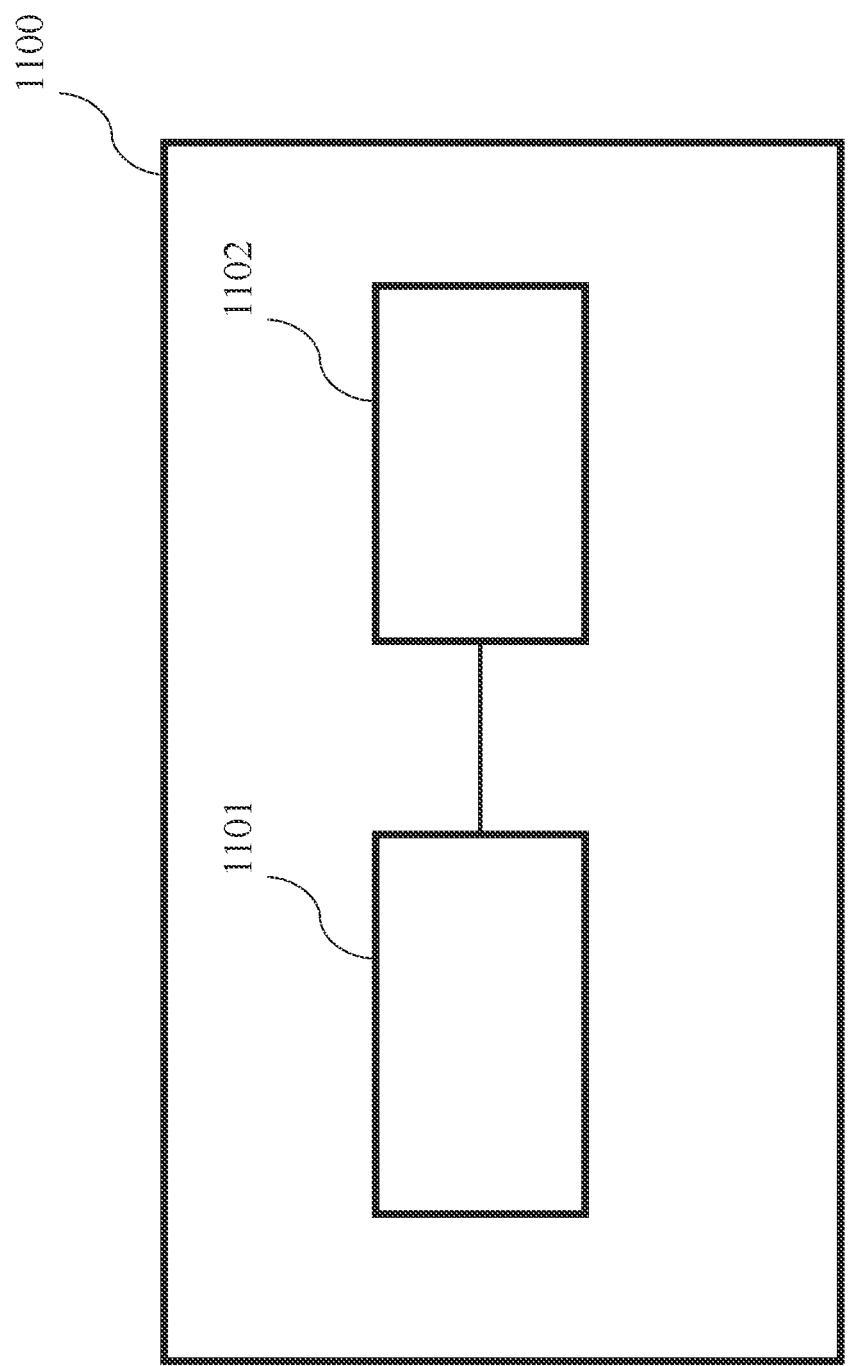
FIG. 11 shows a mobile device according to an embodiment of the invention.

FIG. 11 shows a mobile device 1100 according to an embodiment of the invention. The mobile device 1100 may comprise one or more processors 1101, and a computer memory 1102 that can be read by the one or more processors 1101. Merely as an example, and not limitation, the computer memory 1102 may include computer storage media in the form of volatile and/or non-volatile memory such as read only memory (ROM) and random access memory (RAM).

In some embodiments, a computer program may be stored in the computer memory 1102. The computer program, when executed by the one or more processors 1101, may cause the mobile device 1100 to perform the step of deploying 104 as illustrated in FIG. 5.

Figure 12:
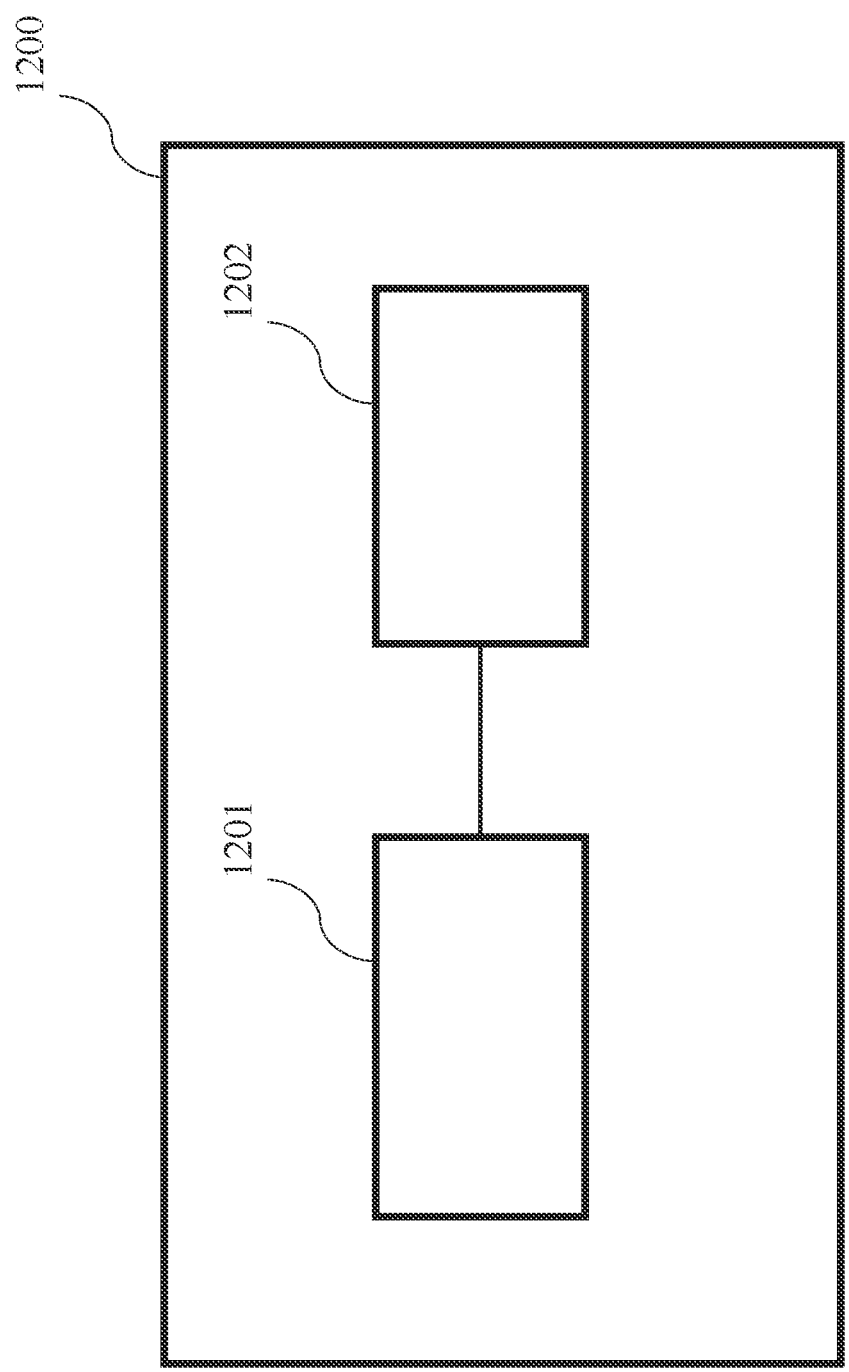
FIG. 12 shows a mobile device according to another embodiment of the invention.

FIG. 12 shows a mobile device 1200 according to another embodiment of the invention.

The computing device 100 may comprise:
a sensor unit 1201; and
a deploying unit 1202 configured to perform the step of deploying 104 as illustrated in FIG. 5.

In particular, the sensor unit 1201 may comprises a visual camera configured to capture one or more images of the target environment 201. Optionally, the sensor unit 1201 may further comprise a depth camera, or a LiDAR system in order to improve the accuracy of the predicted pose information.

Figure 13:
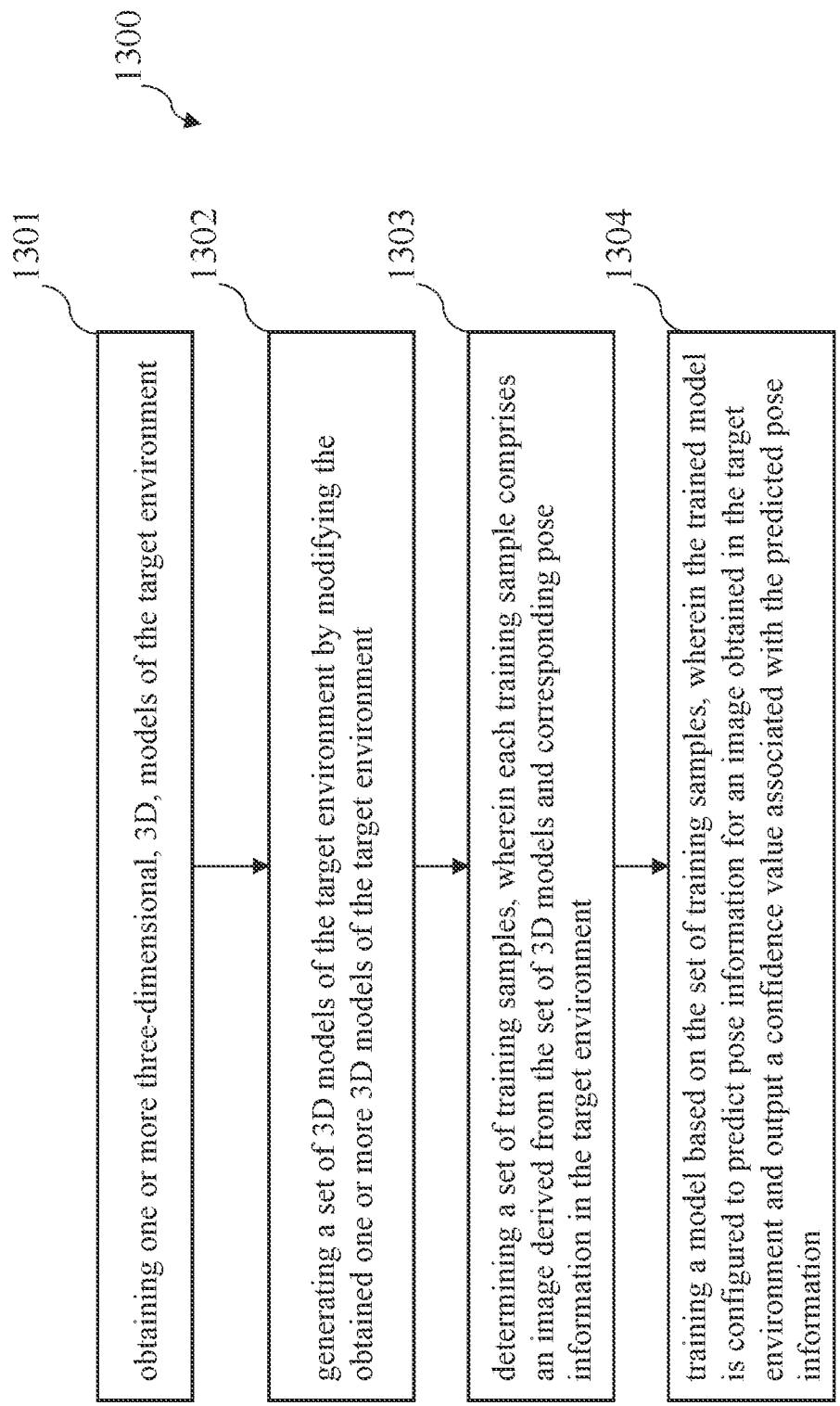
FIG. 13 shows a method for supporting a mobile device to perform a visual localization in a target environment according to an embodiment of the invention.

FIG. 13 shows a method 1300 for supporting a mobile device to perform a visual localization in a target environment according to an embodiment of the invention.

The method 1300 is performed by a computing device, and comprises the following steps:
step 1301: obtaining one or more 3D models of the target environment;
step 1302: generating a set of 3D models of the target environment by modifying the obtained one or more 3D models of the target environment;
step 1303: determining a set of training samples, wherein each training sample comprises an image derived from the set of 3D models and corresponding pose information in the target environment; and
step 1304: training a model based on the set of training samples, wherein the trained model is configured to predict pose information for an image obtained in the target environment and output a confidence value associated with the predicted pose information.

It is noted that the steps of the method 1300 may share the same functions and details from the perspective of FIG. 2-4 described above. Therefore, the corresponding method implementations are not described again at this point.

Figure 14:
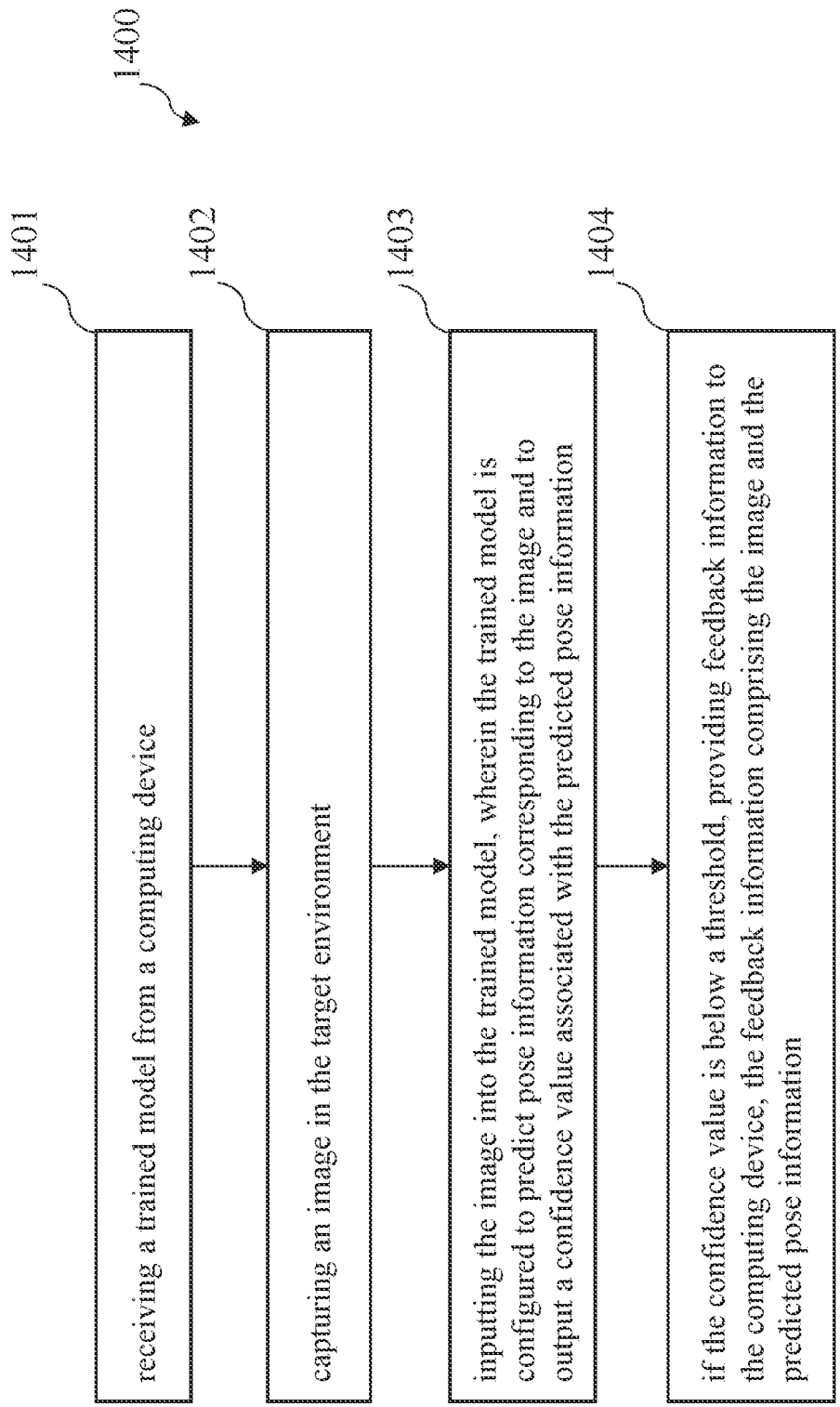
FIG. 14 shows a method for a mobile device performing a visual localization in a target environment according to an embodiment of the invention

FIG. 14 shows a method 1400 for a mobile device performing a visual localization in a target environment according to an embodiment of the invention.

The method 1400 is performed by the mobile device, and comprises the following steps:
step 1401: receiving a trained model from a computing device;
step 1402: capturing an image in the target environment;
step 1403: inputting the image into the trained model, wherein the trained model is configured to predict pose information corresponding to the image and to output a confidence value associated with the predicted pose information; and
step 1404: if the confidence value is below a threshold, providing feedback information to the computing device, the feedback information comprising the image and the predicted pose information.

It is noted that the steps of the method 1400 may share the same functions and details from the perspective of FIG. 5-6 described above. Therefore, the corresponding method implementations are not described again at this point.

An application scenario of the embodiments of the invention may be to set up a localization model applied to a fleet of robots evolving in a warehouse and managing merchandises.

In this scenario, a hand-held mapping platform comprising of an RGB-D camera is operated by an employee to initially map the warehouse where the robots is configured to operate. The mapping step may be repeated a couple of times during different times and on different days before a deployment of the robots, so that diverse representation of the warehouse may be captured. The mapping data may be collected and stored in a high computational capability server configured to compute one or more 3D models of the warehouse. The server is also configured to modify the one or more 3D models, run a rendering algorithm to generate a set of training samples, and train the localization model. The trained localization model may be uploaded to the fleet of robots through a WiFi network. During a merchandise management operation performed by the fleet of robots, the trained localization module may be used to localize each of the robot, as well as to determine a relative position between robots and merchandises. Once a robot has finished is mission, it may return to its charging pod and may upload to the server images of locations where confidences are low. In this way, the server may continuously update the one or more 3D models, render new images, taking into account changes returned from the fleet of robots, and update the trained localization model. The updated localization model may be then send to robots that are in a charging mode.

Embodiments of the present invention are beneficial, since the embodiments may be directly applied for indoor and outdoor visual localization to construct a realistic 3D model. Furthermore, due to the steps of mapping and rendering, a multitude of 3D models may be generated that may not be captured physically in the step of mapping. Further, the set of 3D models may be improved in its diversity and may be portable to different mapping platforms that have different types of sensors and different arrangement of sensors. Moreover, due to the output confidence value associated with the predicted pose information and the step of improving, a reliable prediction may be achieved. Furthermore, the trained model may be constantly updated and improved based on feedback information.

Moreover, sensors with low-cost may be used so that a total cost for performing the visual localization may be reduced. Further, the trained model may be obtained in a fast speed, because there is no need for the mapping platform to physically traverse every single position to capture images and depth data at every different rotations in the target environment. Further, the trained model may be robust to partial occlusion and visual changes.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A computing device for supporting a mobile device to perform a visual localization in a target environment, the computing device comprising:
a memory configured to store instructions; and
a processor coupled to the memory and configured to execute the instructions to cause the computing device to:
obtain one or more three-dimensional (3D) models of the target environment;
dynamically generate a set of 3D models of the target environment by modifying the obtained one or more 3D models of the target environment according to changes in the target environment;
determine a set of training samples, wherein each training sample comprises an image derived from the set of 3D models and corresponding pose information in the target environment; and
train a model based on the set of training samples, wherein the trained model is configured to predict pose information for an image obtained in the target environment and output a confidence value associated with the predicted pose information.

2. The computing device according to claim 1, wherein the one or more 3D models comprise a plurality of different 3D models of the target environment.

3. The computing device according to claim 1, wherein the image of the target environment comprises at least one of:
a picture of the target environment;
a depth map of the target environment; and
a scan of the target environment.

4. The computing device according to claim 1, wherein the processor is further configured to execute the instructions to cause the computing device to:
model an artificial mobile device including one or more visual sensors; and
determine the set of training samples further based on the artificial mobile device.

5. The computing device according to claim 1, wherein the processor is further configured to execute the instructions to cause the computing device to:
compute a set of trajectories, wherein each trajectory models a movement of the mobile device in the target environment; and
determine the set of training samples further based on the set of trajectories.

6. The computing device according to claim 1, wherein modifying the one or more 3D models of the target environment comprises at least one of:
augmenting the 3D model of the target environment with one or more artificial sources of illumination; and
adding to the 3D model of the target environment one or more static and/or dynamic objects.

7. The computing device according to claim 1, wherein modifying the one or more 3D models of the target environment comprises applying a domain translation operation on the one or more 3D models of the target environment.

8. The computing device according to claim 1, wherein the processor is further configured to execute the instructions to cause the computing device to:
apply a domain translation operation or other data augmentation operation on one or more training samples of the set of training samples before training the model based on the set of training samples.

9. The computing device according to claim 1, wherein the processor is further configured to execute the instructions to cause the computing device to:
provide the trained model to the mobile device;
receive feedback information from the mobile device, wherein the feedback information comprises an image obtained in the target environment and corresponding pose information; and
retrain the trained model based on the feedback information.

10. The computing device according claim 9, wherein the processor is further configured to execute the instructions to cause the computing device to:
provide the trained model to one or more further mobile devices;
receive feedback information from each of the one or more further mobile devices; and
retrain the trained model based on all the received feedback information.

11. The computing device according to claim 10, wherein the set of training samples comprises:
   a first subset of training samples for training the model to predict pose information for images obtained in the target environment; and
   a second subset of training samples, disjoint to the first subset of training samples, for training the model to provide confidence values for predictions of pose information.

12. The computing device according to claim 1, wherein the computing device is a mobile device and is configured to train and/or retrain the model in collaboration with one or more further mobile devices.

13. The computing device according to claim 1, wherein the processor is further configured to execute the instructions to cause the computing device to request the one or more 3D models of the target environment from one or more mapping platforms for producing 3D models.

14. A mobile device for performing a visual localization in a target environment, the mobile device comprising:
   a memory configured to store instructions; and
   a processor coupled to the memory and configured to execute the instructions to cause the mobile device to:
      receive a trained model from a computing device, wherein the trained model is generated based on a set of training samples according to a set of 3D models that are dynamically generated according to changes in the target environment;
      capture an image in the target environment;
      input the image into the trained model, wherein the trained model is configured to predict pose information corresponding to the image and to output a confidence value associated with the predicted pose information; and
      in response to the confidence value being below a threshold, provide feedback information to the computing device, the feedback information comprising the image and the predicted pose information.

15. The mobile device according to claim 14, wherein the image of the target environment comprises at least one of:
   a picture of the target environment;
   a depth map of the target environment; and
   a scan of the target environment.

16. A method for supporting a mobile device to perform a visual localization in a target environment, wherein the method is applied to a computing device and comprises:
   obtaining one or more three-dimensional (3D) models of the target environment;
   generating a set of 3D models of the target environment by modifying the obtained one or more 3D models of the target environment;
   determining a set of training samples, wherein each training sample comprises an image derived from the set of 3D models and corresponding pose information in the target environment; and
   training a model based on the set of training samples, wherein the trained model is configured to predict pose information for an image obtained in the target environment and output a confidence value associated with the predicted pose information.

17. A non-transitory computer readable medium comprising a program code which, upon execution by a computer, cause the computer to perform the method according to claim 16.

18. The method according to claim 16, wherein the one or more 3D models comprise a plurality of different 3D models of the target environment.

19. A method for a mobile device performing a visual localization in a target environment, wherein the method comprises:
   receiving a trained model from a computing device, wherein the trained model is generated based on a set of training samples according to a set of three-dimensional (3D) models that are dynamically generated according to changes in the target environment;
   capturing an image in the target environment;
   inputting the image into the trained model, wherein the trained model is configured to predict pose information corresponding to the image and to output a confidence value associated with the predicted pose information; and
   in response to the confidence value being below a threshold, providing feedback information to the computing device, the feedback information comprising the image and the predicted pose information.

20. The method according to claim 19, wherein the image of the target environment comprises at least one of:
   a picture of the target environment;
   a depth map of the target environment; and
   a scan of the target environment.

* * * * *